United States Patent
Talmon et al.

(10) Patent No.: US 9,235,653 B2
(45) Date of Patent: Jan. 12, 2016

(54) DISCOVERING ENTITY ACTIONS FOR AN ENTITY GRAPH

(71) Applicant: Google Inc., Mountain View, CA (US)

(72) Inventors: Haran Talmon, New York, NY (US);
Daniel Walevski, New York, NY (US);
Atanas Frengov, New York, NY (US);
Engin Cinar Sahin, New York, NY (US); Chen Sun, New York, NY (US)

(73) Assignee: Google Inc., Mountain View, CA (US)

( * ) Notice: Subject to any disclaimer, the term of this patent is extended or adjusted under 35 U.S.C. 154(b) by 209 days.

(21) Appl. No.: 13/927,606

(22) Filed: Jun. 26, 2013

(65) Prior Publication Data

US 2015/0006501 A1    Jan. 1, 2015

(51) Int. Cl.
*G06F 17/30* (2006.01)

(52) U.S. Cl.
CPC ............................. *G06F 17/30958* (2013.01)

(58) Field of Classification Search
USPC ........................................................ 707/708
See application file for complete search history.

(56) References Cited

U.S. PATENT DOCUMENTS

| | | | |
|---|---|---|---|
| 7,398,201 B2 * | 7/2008 | Marchisio et al. ................. | 704/9 |
| 7,502,770 B2 | 3/2009 | Hillis et al. | |
| 7,587,387 B2 | 9/2009 | Hogue | |
| 7,672,937 B2 | 3/2010 | Madhavan et al. | |
| 7,765,206 B2 | 7/2010 | Hillis et al. | |
| 7,769,579 B2 | 8/2010 | Zhao et al. | |
| 7,774,328 B2 | 8/2010 | Hogue et al. | |
| 7,792,837 B1 | 9/2010 | Zhao | |
| 7,925,610 B2 | 4/2011 | Elbaz et al. | |
| 8,051,104 B2 | 11/2011 | Weissman et al. | |
| 8,122,026 B1 | 2/2012 | Laroco et al. | |
| 8,204,856 B2 | 6/2012 | Meyer et al. | |
| 8,271,480 B2 | 9/2012 | Diab et al. | |
| 8,326,847 B2 * | 12/2012 | Balmin et al. ................. | 707/754 |
| 8,332,409 B2 * | 12/2012 | Waddington et al. ......... | 707/737 |

(Continued)

FOREIGN PATENT DOCUMENTS

| | | |
|---|---|---|
| WO | 0014651 A1 | 3/2000 |
| WO | 2010085523 A1 | 7/2010 |

OTHER PUBLICATIONS

Yedidia et al., "Understanding Belief Propagation and its Generalizations", Mitsubishi Electric Research Laboratories, Nov. 2001, 36 pages.

(Continued)

*Primary Examiner* — Kim Nguyen
(74) *Attorney, Agent, or Firm* — Brake Hughes Bellermann LLP

(57) ABSTRACT

Systems and methods identify recent or ephemeral events involving entities that can be used to update a data graph or provide enhanced search results. For example, a computer-implemented method includes determining at least one search term for an entity in a data graph and determining a time period having an increase in queries for the at least one search term, the increase meeting a threshold. The method may include determining documents having dates associated with the time period, the documents being responsive to the at least one search term, and analyzing the documents to determine a subject, verb, object triple, where the search term corresponds to the subject or the object of the triple. The method may also include providing an update for the data graph based on the triple. The method may also include generating text describing the triple for inclusion in a search result for the search query.

19 Claims, 7 Drawing Sheets

(56) References Cited

U.S. PATENT DOCUMENTS

| | | | |
|---|---|---|---|
| 8,370,128 B2 | 2/2013 | Brun et al. | |
| 8,401,797 B2* | 3/2013 | Hlavacek et al. | 702/19 |
| 8,402,018 B2* | 3/2013 | Lee et al. | 707/723 |
| 8,407,162 B2* | 3/2013 | Devitt et al. | 706/12 |
| 8,407,253 B2* | 3/2013 | Ryu et al. | 707/790 |
| 8,429,179 B1* | 4/2013 | Mirhaji | 707/756 |
| 8,429,512 B2* | 4/2013 | Sharon et al. | 714/799 |
| 8,433,661 B2* | 4/2013 | Eggert et al. | 706/12 |
| 8,442,839 B2* | 5/2013 | Yen et al. | 705/1.1 |
| 8,442,940 B1* | 5/2013 | Faletti et al. | 707/610 |
| 2008/0306934 A1 | 12/2008 | Craswell et al. | |
| 2009/0094211 A1 | 4/2009 | Marvit et al. | |
| 2010/0121839 A1 | 5/2010 | Meyer et al. | |
| 2011/0040776 A1 | 2/2011 | Najm et al. | |

OTHER PUBLICATIONS

Kersting et al., "Counting Belief Propagation", UAI 2009, 8 pages.

Mayfield et al., "ERACER: A Database Approach for Statistical Inference and Data Cleaning", SIGMOD '10, Jun. 6-11, 2010, 12 pages.

Lao et al., "Relational Retrieval Using a Combination of Path-Constrained Random Walks", Mach Learn, vol. 81, Jul. 22, 2010, pp. 53-67.

Lao et al., "Fast Query Execution for Retrieval Models Based on Path-Constrained Random Walks", KDD '10, Jul. 25-28, 2010, pp. 881-888.

Kahng et al., "Ranking Objects by Following Paths in Entity-Relationship Graphs", PIKM '11, Oct. 28, 2011, pp. 11-18.

Lao et al., "Random Walk Inference and Learning in a Large Scale Knowledge Base", Conference on Empirical Methods in Natural Language Processing, 2011, 11 pages.

Singh et al., "Large-Scale Cross-Document Coreference Using Distributed Inference and Hierarchical Models", Proceedings of the 49th Annual Meeting of the Association for Computational Linguistics: Human Language Technologies, vol. 1, 2011, 11 pages.

Lao et al., "Reading the Web with Learned Syntactic-Semantic Inference Rules", Proceedings of the 2012 Joint Conference on Empirical Methods in Natural Language Processing and Computational Natural Language Learning, 2012, 10 pages.

Lao, Ni, "Efficient Random Walk Inference with Knowledge Bases", Thesis, The Carnegie Mellon University, Jul. 2012, 139 pages.

Lardinois, Frederic, "Google's Knowledge Graph Now Explains Connections Between Your Query and Items in 'People Also Search for Section", TechCrunch, Oct. 19, 2012, 6 pages.

* cited by examiner

DISCOVERING ENTITY ACTIONS FOR AN ENTITY GRAPH

BACKGROUND

Entities such as people, places, things, concepts, etc., may be the subject of queries. Some search systems may store entities as nodes in a graph-based data store, or data graph. The edges that link one entity with another may indicate a relationship between the nodes. For example, the nodes "Baltimore, Md." and "United States" may be linked by the edges of "in country" and "has state." A search system may use the graph-based data store to provide information about an entity in response to a query. However, such graph-based data stores may lack information about what an entity has done or what has happened to an entity when the events are ephemeral or recent. For example, a celebrity may have a wedding or a birth that receives news coverage but is too recent to be reflected in the data graph. Similarly, a company may have sponsored a sports event, launched a product, or been involved in an environmental disaster. These events may not be captured in the graph-based data store, but may be of interest to someone initiating a search for the company.

SUMMARY

Some implementations enable a system to identify recent or ephemeral events involving entities. In other words, the system may be capable of determining what happened to a particular entity. Such events or actions may be used to update a graph-based data store and/or to provide enhanced search results to queries related to the entity. The search system may discover the actions or events by determining a period of time in which queries for the entity temporarily increased, for example above an expected number or above an average number, and analyzing the content of documents that are responsive to the queries. The temporary increase in the number of queries, or spike, may indicate that some event caused more people than usual to submit queries related to the entity. When the time period is determined, the system may select content, such as news articles, web pages, etc., responsive to the search terms and temporally close to the time period. The temporal distance can be dependent on the amount of time that has passed since the spike, the size of the spike, other parameters, or a combination of these.

The system may use semantic and/or syntactic analysis on the content of the documents to identify actions associated with the entity. For example the system may analyze the headlines of news articles or other content to identify verbs associated with nouns, pronouns, or pronominals that refer to the entity. This may be done over several different sources, e.g., different documents. The actions identified in the documents may be clustered, to determine whether the documents include sufficient agreement on a particular action. If a particular action has sufficient agreement, the system may use the action to update the graph-based data store. In some implementations, the action may be used to enhance query search results.

One aspect of the disclosure can be embodied in a system that includes memory storing search records, memory storing a graph-structured knowledge base that includes entities linked to other entities by relationships, at least one processor, and memory storing instructions that, when executed by the at least one processor, cause the computer system to perform operations. The operations may include determining a search term associated with a first entity that is identified in a graph-based data store and determining a time period having an amount of queries for the search term that meets a threshold. The operations may further include selecting documents associated with the time period that are responsive to the search term, analyzing the selected documents for an action co-occurring with the search term, and determining a second entity associated with the action and the search term. The operations may further include providing the second entity, the action, and the first entity as an update for the graph-based data store.

The system can include one or more of the following features. For example, the entity may be associated with a query and the memory may further store instructions that, when executed by the at least one processor, causes the computer system to: generate text for the action and the first entity and include the text in a search result for the query. In such implementations, the text may be first text and the search result may include second text describing relationships for the entity from the graph-based data store. As another example, the threshold may be higher than an average number of queries for a second time period occurring prior to the time period and a third time period occurring subsequent to the time period. In some implementations, analyzing a particular document of the selected documents includes identifying verbs in content of the particular document and generating a triple for at least one verb of the identified verbs. The triple may include a subject, the at least one verb, and an object, wherein either the subject or the object represents the search term, and the action may be derived from the triple. In some implementations deriving the action includes determining whether the at least one verb maps to a target action and selecting the target action as the action when the at least one verb maps to the target action.

In some implementations, the second entity is not already identified in the graph-based data store. In some implementations, the memory further stores instructions that, when executed by the at least one processor, cause the computer system to automatically update the graph-based data store when the at least one verb maps to a target action.

In another aspect, a computer-implemented method includes determining, by at least one processor, at least one search term for an entity in a data graph and determining a time period having an increase in queries for the at least one search term, the increase meeting a threshold. The method may also include determining documents having dates associated with the time period, the documents being responsive to the at least one search term, and analyzing the documents to determine a subject, verb, object triple, where the search term corresponds to the subject or the object of the triple. The method may also include providing an update for the data graph based on the triple.

The method can include one or more of the following features. For example, the dates for the documents are within a temporal distance of the time period. The temporal distance may be determined as a function of a size of the increase or as a function of an amount of time that has elapsed time since the time period. As another example, the method may include identifying verbs in content of the document, matching at least one verb of the identified verbs to one target action from a set of target actions, and generating the triple using the target action as the verb. In such implementations, the method may also include automatically updating the data graph in response to the at least one verb mapping to the target action. The target actions in the set of target actions may correspond with respective relationships in the data graph.

In some implementations the analyzing results in a plurality of triples and the triple is in the plurality of triples, and selecting the at least one action includes clustering the triples in the plurality of triples into cluster groups based at least on the verbs of the triples, determining whether at least one cluster group meets a threshold cluster score, and providing the update when the at least one cluster group meets the threshold cluster score, wherein the triple is a member of the at least one cluster group. In such implementations the triple may be selected based on centrality of the triple to the cluster group. In some implementations, the threshold is greater than an average frequency of queries that are associated with the at least one search term for time periods of similar length and/or the at least one search term includes a name of the entity appended with a form of a verb.

In another aspect, a computer-implemented method includes determining, by at least one processor, at least one search term for an entity in a data graph that relates to a search query and determining a time period having an amount of queries that meets a threshold, the queries included in the amount being associated with the at least one search term. The method may also include determining documents having dates associated with the time period, the documents being responsive to the at least one search term and analyzing the documents to determine a subject, verb, object triple. The search term may correspond to the subject or the object of the triple. The method may also include generating text describing the triple for inclusion in a search result for the search query.

One or more of the implementations of the subject matter described herein can be implemented so as to realize one or more of the following advantages. As one example, the system may identify recently occurring facts for inclusion in a graph-based data store, making the data store more complete and timely. As another example, the system may identify facts about an entity that are ephemeral but of interest to a person wanting to know more about the entity and include these facts in an enhanced search result. The facts may be identified in response to a query or as part of a scheduled process to identify recent facts to add to the graph-based data store.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
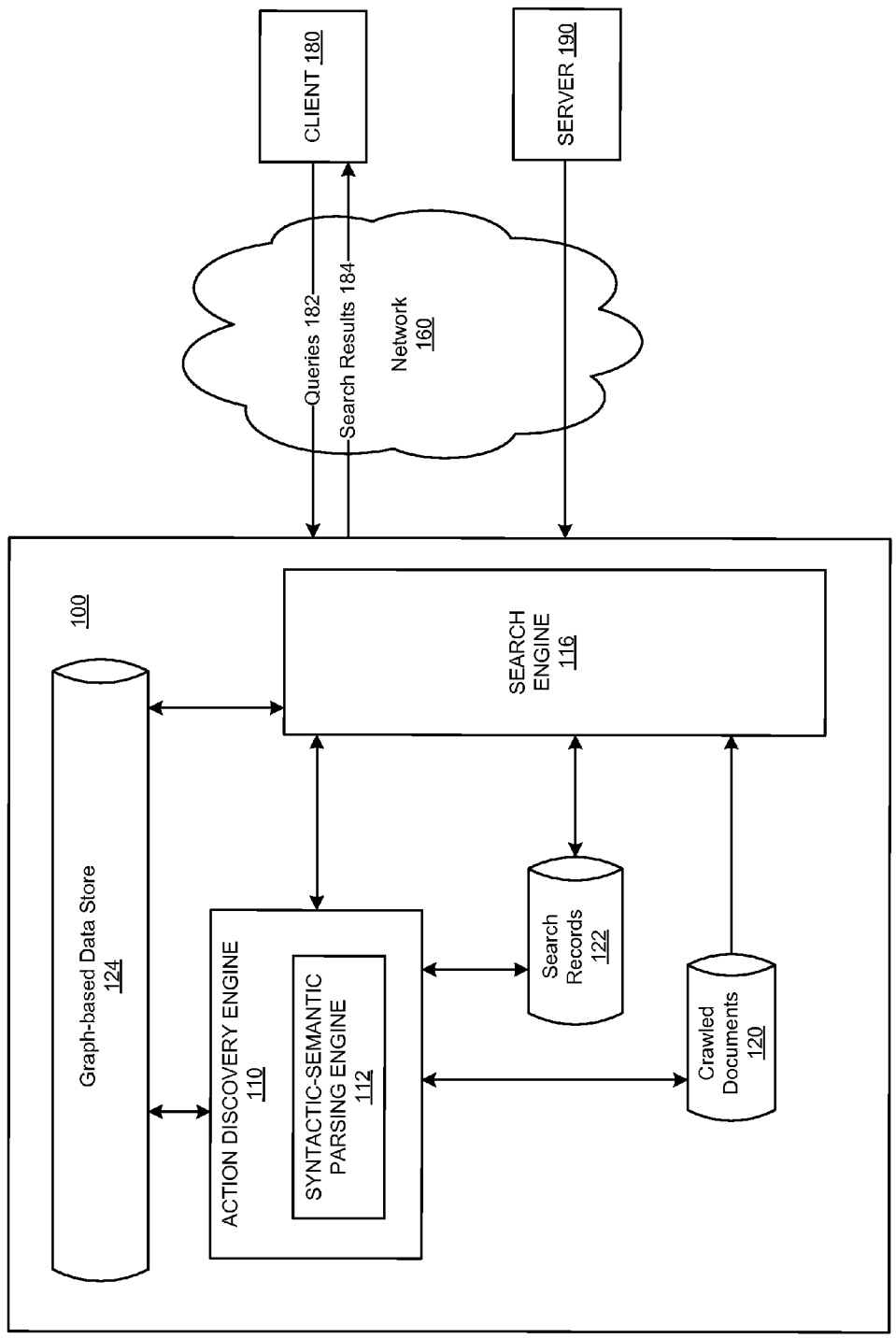
FIG. 1 illustrates an example system in accordance with some implementations.

FIG. 1 is a block diagram of a system 100 in accordance with an example implementation. The system 100 may be used to implement a search engine that discovers recent or ephemeral actions for a particular entity. The depiction of system 100 in FIG. 1 is described as a system capable of searching an Internet corpus to update a graph-based data store that includes entities mentioned in the Internet corpus or to enhance search results derived primarily by querying the graph-based data store. The system may provide additional entities and relationships to add to the graph-based data store and/or provide additional facts for inclusion in a search result that is generated, at least in part, using the graph-based data store. Other configurations and applications of the described technology may be used. For example, the expanded search results may be provided for other corpora, such as intranets, libraries, or other document repositories. In some implementations the discovered facts about an entity may be automatically added to the graph-based data store.

Figure 7:
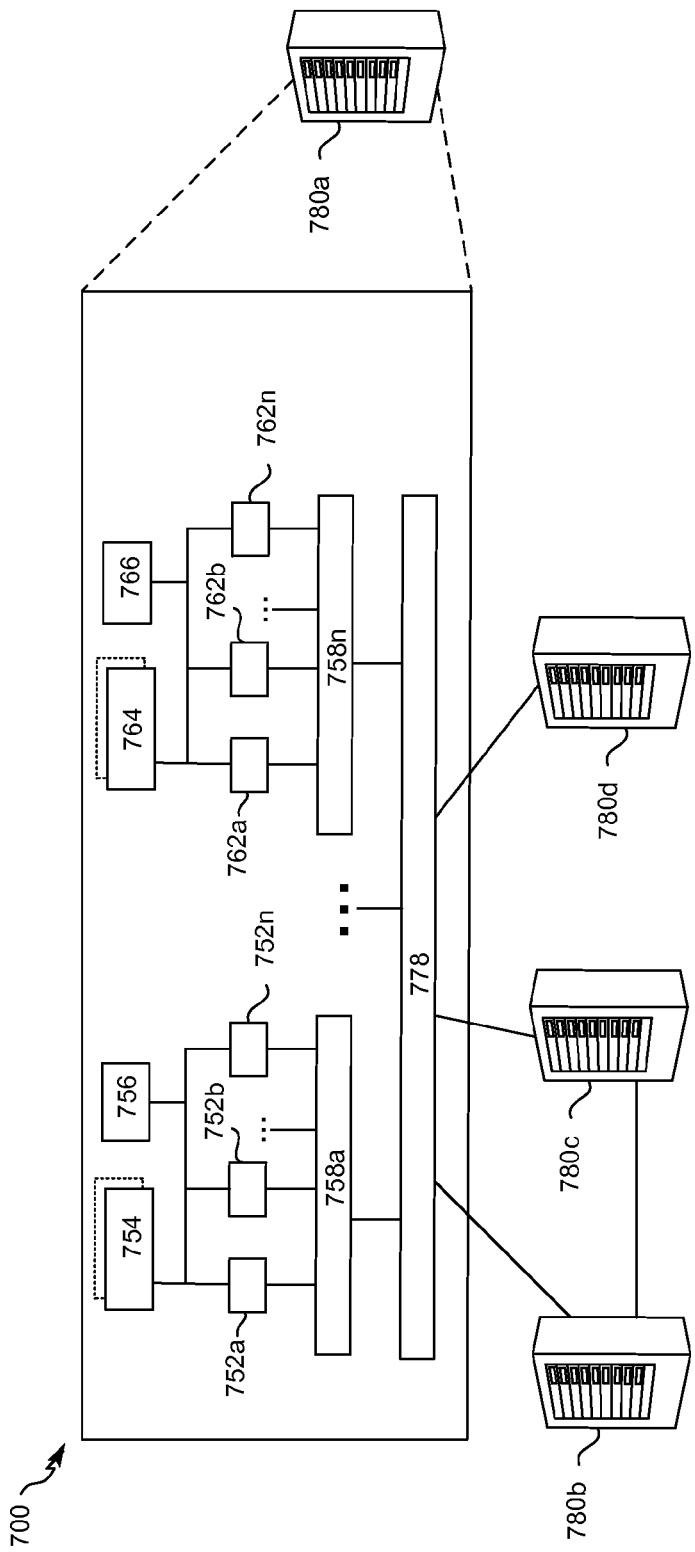
FIG. 7 shows an example of a distributed computer device that can be used to implement the described techniques.

The search system 100 may receive queries 182 from a client device 180 and return search results 184 in response to the queries. Each query 182 is a request for information. Query 182 can be, for example, text, audio, images, or scroll commands. The system 100 may include search engine 116, action discovery engine 110, and syntactic-semantic parsing engine 112. System 100 may be a computing device that takes the form of a number of different devices, for example a standard server, a group of such servers, or a rack server system. In some implementations, syntactic-semantic parsing engine 112, action discovery engine 110, and search engine 116 may each be a separate computing device, or they may share components such as processors and memories. For example, the action discovery engine 110, the syntactic-semantic parsing engine 112, and the search engine 116 may be implemented in a personal computer, for example a laptop computer. In some implementations, the action discovery engine 110, the syntactic-semantic parsing engine 112, and the search engine 116 may be distributed systems implemented in a series of computing devices, such as a group of servers. The system 100 may be an example of computer device 700, as depicted in FIG. 7.

The system 100 may include a graph-based data store 124. A graph-based data store is a data graph that stores information in the form of nodes and edges, with nodes being connected by edges. A node in a data graph may represent an entity, such as a person, place, item, idea, topic, abstract concept, concrete element, other suitable thing, or any combination of these. Entities in the graph may be related to each other by edges, which may represent relationships between entities. For example, the data graph may have an entity that corresponds to George Washington and the data graph may have a has profession relationship between the George Washington entity and a U.S. President entity and a Military General entity. An indexing engine may maintain the graph-based data store 124 to allow a search engine to search the data graph, for example finding entities related to other entities by one or more relationships or paths in the graph. The graph-based data store 124 may include an index or some other method for searching for and retrieving data from the data store.

Figure 2:
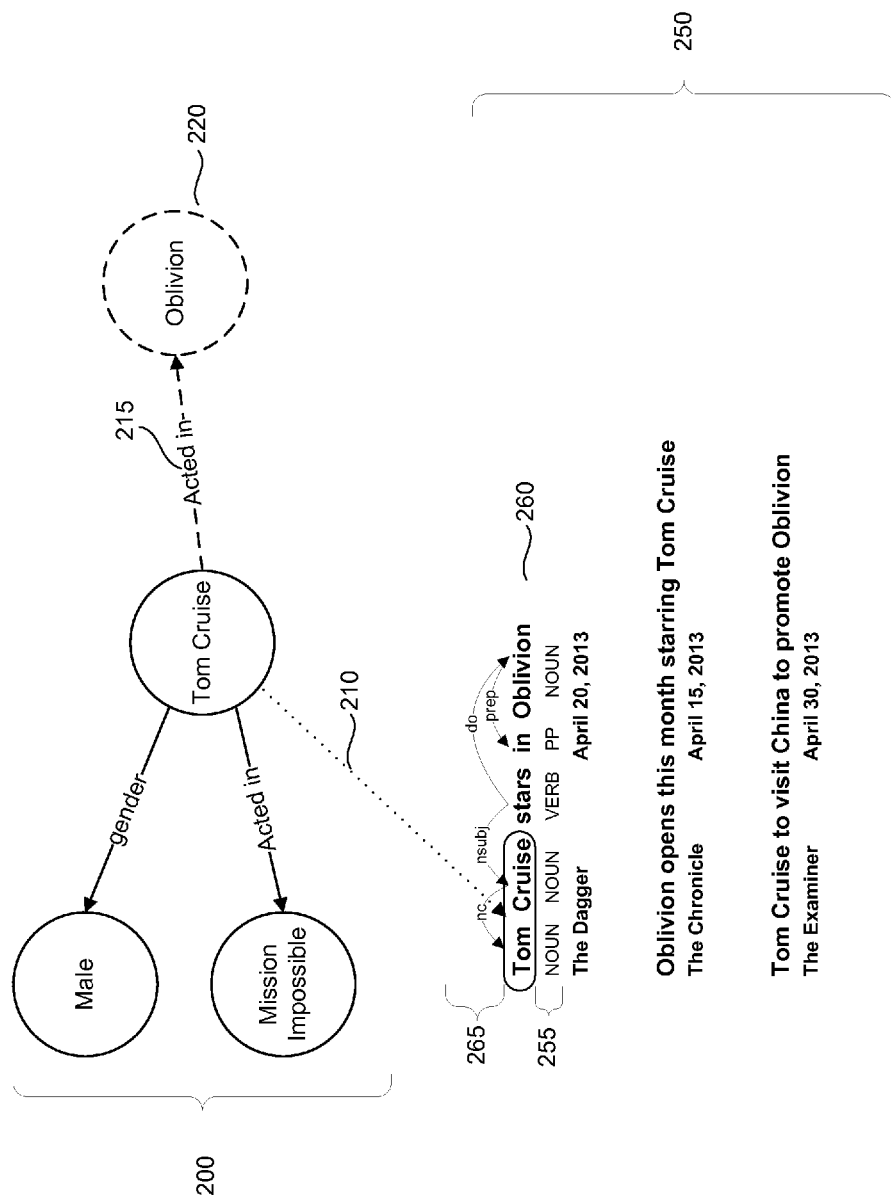
FIG. 2 illustrates a representation of a data graph, with entities as nodes and relationships as edges between nodes and illustrates snippets of documents that reference one of the entities in the graph-based data store.

The graph-based data store 124 may include information from which a graph, such as the graph 200 illustrated in FIG. 2, can be created. For the purposes of this application, reference to a data graph may be considered reference to the index for the data graph and vice versa. The nodes of the data graph may be referred to as entities and the edges may be referred to as relationships between two entities. As used herein, entity may refer to a physical embodiment of a person, place, or thing or a representation of the physical entity, e.g., text, or other information that refers to an entity. For example, an entity may be the physical location of Yosemite National Park or an abstract concept that refers to Yosemite. Thus, the graph-based data store 124 may configured to allow the search engine 116 to determine entities and relationships stored in the corresponding data graph. In some implementations, the index for data store 124 may be a two-dimensional posting list in that each posting list value has one or more associated intersection identifiers and each intersection identifier may have one or more associated result identifiers. The posting list may be for an entity or for a relationship. If the posting list is for an entity, the intersection identifiers may be relationship identifiers. If the posting list is for a relationship, the intersection identifiers may be entity identifiers. For example, if entity a is connected to entities b and c by relationship d in the data graph, a posting list for entity a may have the identifier for relationship d as the intersection identifier and the identifiers for b and c as result identifiers for the intersection identifier for relationship d. Other methods of providing an index for the data store 124 may be used.

The search engine 116 may search the graph-based data store 124 in addition to other document corpora in responding to a search request. For example, the search engine 116 may also be capable of searching a corpus of crawled documents 120 in addition to the graph-based data store 124. Crawled documents 120 may include an index for searching for terms or phrases within a corpus of documents. In some implementations the corpus may be documents available on the Internet. Documents may include any type of file that stores content, such as sound files, video files, text documents, source code, news articles, blogs, web pages, PDF documents, spreadsheets, etc. In some implementations, crawled documents 120 may store one-dimensional posting lists that include phrases, terms, or document properties as posting list values and, for each posting list value, identifiers for documents related to the phrase or term. While an index for crawled documents 120 has been described as using posting lists, the index may have some other known or later developed format.

The system 100 may also include search records 122. Search records 122 may include search logs, aggregated data gathered from queries, or other data regarding the date/time and search terms of previously processed queries. In some implementations, the search records 122 may be generated by search engine 116 in the normal process of generating search results 184. The graph-based data store 124, crawled documents 120, and search records 122 are stored on tangible computer-readable storage devices, for instance disk, flash, cache memory, or a combination of these, configured to store data in a semi-permanent or non-transient form. In some implementations graph-based data store 124, crawled documents 120, and search records 122 may be stored in a combination of various memories.

In some implementations, the system 100 may include an indexing engine (not shown) that includes one or more processors configured to execute one or more machine executable instructions or pieces of software, firmware, or a combination thereof to create and maintain graph-based data store 124 and/or crawled documents 120, etc. The indexing engine may obtain content from, for example, one or more servers 190, and use the content to maintain graph-based data store 124 and/or crawled documents 120. In some implementations, the servers 190 may be web servers, servers on a private network, or other document sources that are accessible by the indexing engine. The indexing engine may be one or more separate computing devices, such that graph-based data store 124 is maintained by a first set of computing devices and crawled documents 120 is maintained by a second set of computing devices, etc.

The search engine 116 may include one or more computing devices that use the graph-based data store 124 and/or crawled documents 120 to determine search results 184 for queries 182, for example, using conventional or other information retrieval techniques. Search engine 116 may include one or more servers that receive queries 182 from a requestor, such as client 180, and provide search results 184 to the requestor. Search results 184 may include information from documents responsive to the query, information from relationships and entities in the graph-based data store 124, and information from search records 122. For example, the search engine 116 may include a ranking engine that identifies documents responsive to the query from crawled documents 120 and calculates scores for the documents responsive to the query, for example, using one or more ranking signals. The ranking engine may rank the documents found responsive to the query using the scores.

The system 100 may also include an action discovery engine 110. The action discovery engine 110 may include one or more computing devices that include one or more processors configured to execute machine executable instructions or pieces of software, firmware, or a combination thereof. The action discovery engine 110 may share a computing device or devices with the search engine 116, or may operate using one or more separate computing devices. The action discovery engine 110 may use the graph-based data store 124, the search records 122, and the crawled documents 120 to determine actions an entity has performed or been party to. These actions may not be captured in the graph-based data store because they are too recent to have been discovered through other methods, because the event was too ephemeral or too long ago to have been captured, or for any other reason the processes that update the graph-based data store 124 have not captured the action. The action may also include another entity that has not yet been identified in the graph-based data store 124. In some implementations, the action discovery engine 110 may receive an entity that is associated with the query. For example, the search engine 116 may send the entity, or an entity identifier, to the action discover engine 110. The action discovery engine 110 may determine one or more search terms for the entity and use the search terms to look for a time period with an abnormally high number of queries related to the search terms in the search records 122, as will be described in more detail below. In some implementations, if the action discovery engine 110 is unable to locate a time period with an abnormally high number of queries related to the search terms, the action discovery engine 110 may use a recent time period. In some implementations, the action discovery engine may receive a time period rather than determining the time period. For example, the analysis discovery engine 110 may be configured to search for recent events for some set of entities in the data graph. In such implementations, the analysis discovery engine 110 may select a short, but recent, time period, without reference to the search records 122.

The action discovery engine 110 may use the time period, also referred to as a window of interest, to identify documents, for example from crawled documents 120, that are associated with the window of interest and responsive to the search terms. Thus, the action discovery engine 110 selects a set of documents relevant to the entity that are contemporaneous with an unusually high period of queries for the entity or that are contemporaneous with another specified time frame. The action discovery engine 110 may then examine the set of documents to determine one or more actions involving the entity.

For example, in some implementations, the action discovery engine 110 may include a syntactic-semantic parsing engine 112. The syntactic-semantic parsing engine 112 may analyze the crawled documents to determine references to entities, actions performed by or happening to the entity, and potentially other entities involved in the action. For example, the syntactic-semantic parsing engine 112 may perform part-of-speech tagging, dependency parsing, noun-phrase extraction, and coreference resolution on the content of the documents. FIG. 2 illustrates an example of a portion of a document that has been analyzed in such a manner. Part-of-speech tagging identifies the part of speech that each word in the text of the document belongs to, as represented by items 255 of FIG. 2. Dependency parsing identifies the relationships between the parts-of-speech. Dependency parsing creates a text graph for each sentence, with each edge labeled with a standard dependency tag, as represented by items 265 of FIG. 2. Noun-phrase extraction identifies, or segments, noun phrases such as the phrases "Barack Obama," "Secretary Clinton," or "First Lady." In other words, noun-phrase extraction aims to identify potential mentions of entities, including the words used to describe them. For example, in FIG. 2 the syntactic-semantic parsing engine 112 identifies noun-phrase of Tom Cruise, as indicated by the grouping of these words in line 260 of FIG. 2. Coreference resolution aims to match a pronoun or pronominal to a noun phrase. The syntactic-semantic parsing engine 112 may use any known or later developed method for part-of-speech tagging, dependency parsing, noun-phrase extraction, and coreference resolution as part of its syntactic and semantic analysis. "Accurate Unlexicalized Parsing" by Klein et al. in the Proceedings of the 41$^{st}$ Annual Meeting on Association for Computational Linguistics, July 2003, and "Simple Coreference Resolution With Rich Syntactic and Semantic Features" by Haghighi et al. in Proceedings of the 2009 Conference on Empirical Methods in Natural Language Processing, August 2009, which are both incorporated herein by reference, provide examples of such methods.

Using syntactic and semantic analysis, the parsing engine 112 may generate a number of subject-verb-object triples. In some implementations, the system 100 may include a list of target actions that map to possible verbs, verb stems, and/or verbs with another part of speech. For example, "wins election," "wins," "is elected," "defeats," "is voted in," may all map to the target action "wins election," depending on the syntax. In such implementations, the verb of the triple may be the target action rather than the actual verb used in the document content.

Once the syntactic-semantic parsing engine 112 has analyzed the content of the document and identified subjects-verb-object triples, the action discovery engine 110 may link one or more of the subjects and objects to entities in the data graph 124. The linking may occur through entity resolution, or determining which entity from the data graph, if any, matches a noun-phrase in a document. Entity matching may allow the action discovery engine 110 to determine whether a particular subject-verb-object triple has a corresponding match in the graph-based data store 124. For example, link 210 of FIG. 2 illustrates a match between the noun phrase "Tom Cruise" in a document and the entity Tom Cruise in the data graph 124.

The analysis discovery engine 110 may use the subject-verb-object triples to generate new entities and/or relationships for the graph-based data store 124. For example, the analysis discovery engine 110 may analyze the data store 124 and determine whether the data graph includes the fact represented by the triple, or whether it can be added to the data graph. The relationship 215 and the entity 220 of FIG. 2 illustrate a new relationship and a new entity generated by the system through analysis of the documents 250. In some implementations, the analysis discovery engine 110 may cluster the triples generated from the set of documents into cluster groups and use a clustering score to select actions, represented by the triples, with sufficient agreement. For example, the analysis discovery engine 110 may require a certain number of triples in a cluster group before providing an update for the data graph 124. In some implementations the analysis discovery engine 110 may cluster the triples by verb. In some implementations the analysis discovery engine 110 may cluster the triples by verb and object. In some implementations the clustering may take into account the search popularity of detected terms or their related terms. Related terms may be terms that are defined with a similar meaning, e.g., synonyms, or a similar search traffic profile during or near the relevant time period.

In some implementations, the analysis discovery engine 110 may suggest a new entity for the data graph 124 and/or a new relationship between the new entity and the entity the action analysis discovery engine 110 received. In some implementations, the analysis discovery engine 110 may automatically update the data graph 124 with the new entity and/or the new relationship, for example when a confidence score for the new entity/relationship meets a threshold. The confidence score may be based on whether the new relationship is in a predetermined list of relationships, for example the target actions, whether the cluster score meets a minimum score, or when a predetermined number of triples share a verb-object, etc. The action discovery engine 110 may also use other measures of confidence to automatically update the data graph 124.

The search engine 116 may be in communication with the client(s) 180 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the search engine 116 may communicate with and transmit data to/from clients 180. For example, search engine 116 may transmit search results or suggested updates to one or more of clients 180.

Figure 3:
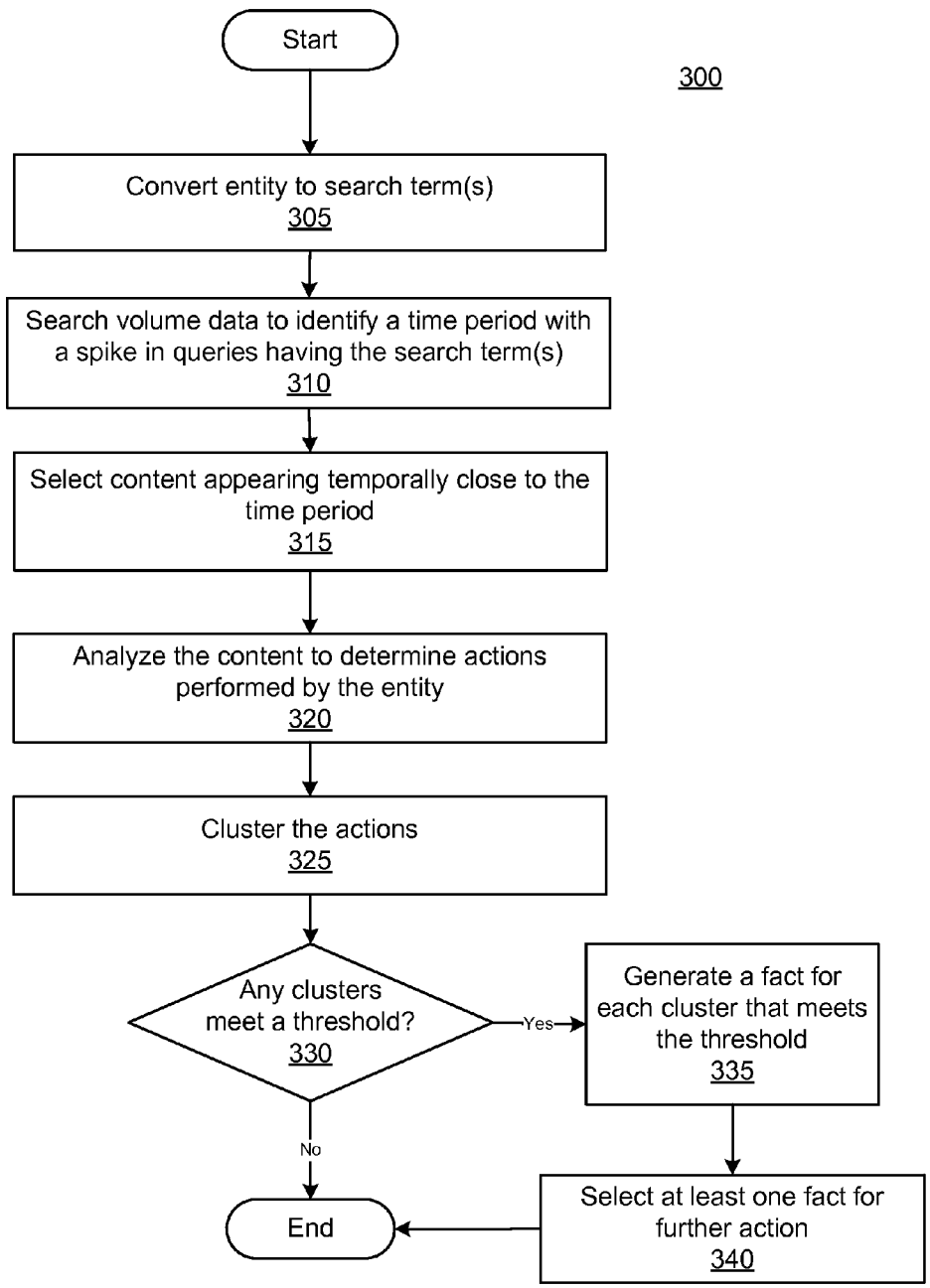
FIG. 3 illustrates a flow diagram of a process for discovering entity actions, consistent with disclosed implementations.

FIG. 3 illustrates a flow diagram 300 of a process for discovering entity actions, consistent with disclosed implementations. The process 300 may be performed by a search system, such as system 100 of FIG. 1. The search system may use process 300 to suggest new entities or relationships for a graph-based data store, to provide additional information for a search result, or for other purposes that can use recent or ephemeral facts about an entity.

Process 300 may begin with the system converting an entity from the graph-based data store to one or more search terms or phrases. The entity may have been selected because of its relationship to a query submitted by a query requestor. The entity may have also been selected as part of a batch process that seeks to update the graph-based data store with recent events. In such an implementation, the system may determine entities for updating using the search records entities associated with popular or trending queries. The system may use any known or later developed method for generating search terms for the entity. In one implementation, the system may append qualifying term to the full name, partial name, or nickname of an entity. A qualifying term may be a form of any verb commonly used to describe general actions. For example, the verb "to do" or "to have" may be used to generally query what an entity has been doing, or has happened to an entity. Thus, for example, the entity may be Barack Obama and the search terms can be "Barack", "Obama", "Barack Obama", "current president", "Obama did", "Obama had", etc. In some implementations, the information from graph-based data store may be used to convert the entity into search terms. For example, in addition to the above, the system may generate the search term "President Obama" and/or "President Obama had" because the graph-based data store indicates that the entity Barack Obama is the president of the United States.

The system may use the search terms generated for the entity to examine search records to identify a time period with an increase in queries for the search terms (310). For example, the system may examine historical data for queries to determine a time period where the number of queries using the search terms exceeds the number of queries using the search terms in periods just prior or subsequent to the time period. In other words, the system may search for time period with a spike in queries that use the search terms. In some implementations, step 310 is optional because a time period is provided to process 300. For example, a batch process that seeks to update the graph-based data store with recent activity may provide a recent time period to process 300. Of course there may be other reasons for providing a time period to process 300. The time period provided to process 300 or the time period identified may be referred to as the window of interest.

The system may search a document corpus or some other content store to determine content, such as documents, appearing temporally close to the window of interest (315). For example, the system may search news articles, blogs, or other documents that have a date temporally close to the window of interest. The date of the content may be, for example, a published date, a byline date, or a date created. In some implementations, the document corpus may store earlier versions of documents so that the system can analyze the content of a document as it appeared during the window of interest. A document is considered temporally close to the window of interest if the date associated with the document falls within the window. A document may also be temporally close to the window of interest if the date associated with the document falls within a certain temporal distance of the window. The temporal distance may be based on the amount of time that has elapsed since the window, so that older windows of interest have a larger temporal distance. For example, if the window of interest represents a time period that is two years old, the temporal distance may be a week, but if the window of interest is only a week old, the temporal distance may be one day. The temporal distance may also be based on the size of the increase in query activity, i.e., the spike, so that a larger increase in query activity supports a larger temporal distance value. In some implementations, the temporal distance may be fixed at a predetermined distance regardless of the age of the window of interest and/or the size of the spike. The temporal length may also depend on other parameters related to the window of interest, the query terms, and the query activity.

The system may analyze the selected content to determine possible actions performed by the entity (320). This may be accomplished through semantic and/or syntactic analysis of the content using known or later developed techniques. The result of the analysis may generally include a subject, verb, and object for each action. One method of analyzing the content is illustrated in more detail below with regard to FIG. 4. The system may cluster the information discovered to determine if there is a consistent action that corresponds to a significant proportion of the determined actions (325), using known clustering techniques. For example, the system may cluster like verbs and like objects together. Other information from the analysis, such as context information, may be used to cluster the possible actions. For example, the possible actions "wins election," "defeats opponent" and "is elected" may all cluster together. The clustering may result in a cluster score for each cluster. In some implementations, the cluster score can incorporate the search popularity of detected terms or their related terms during or near the window of interest. Search terms may be related if they have a similar meaning, e.g., are considered synonyms, or a similar search traffic profile. The cluster score may also be based on the number of potential actions in the cluster, so that a cluster with a high number of potential actions receives a higher cluster score.

The system may determine whether any clusters have a cluster score that meets a threshold (330). If one or more of the clusters has a score that meets the threshold (330, Yes), the system may generate a fact that describes the action represented by the cluster (335). The fact may represent a new relationship and/or entity in the data graph. For example, the system may synthesize a fact based on the action represented by the cluster. For example, if the clustered actions represent an election win for the entity, the system may generate a has profession relationship between the entity and a Politician entity in the graph-based data store. Likewise, if the clustered actions represent the birth of a child for the entity, the system may generate a new entity in the data graph that represents the child and generate a has child relationship between the entity and the new entity. The fact may also be a sentence describing an action that can be included in a search result. For example, the system may generate a sentence that describes the fact. The sentence may be based on text retrieved from the content that was analyzed. For example, the sentence may be selected based on a retrieval score calculated as part of step 315, the degree of correspondence within the cluster, whether other discovered facts disagree with the fact, the part of the document the sentence appears in, etc. For example, a sentence that is in a document title may be selected over other possible sentences. As another example, a sentence that corresponds more strongly with other like sentences may be selected over a sentence that does not have as many like sentences in the cluster. Of course, other methods of selecting the sentence may be used, such as selecting text marked up with HTML, text noted in micro-formatting tags, etc.

Of the facts determined in step 335, the system may select at least one fact for further action, such as automatically updating the graph-based data store, suggesting an update to the graph-based data store, or using the fact to enhance a search result (340). In some implementations, all generated facts may be used to update or suggest updates to the graph-based data store. In some implementations, the fact may have an associated confidence score and only those facts with a confidence score that meets a confidence threshold may be used to automatically update the graph-based data store. In some implementations the confidence score may be based on inclusion of an action represented by the fact appearing in a list of target actions. In some implementations the confidence score may be based on the same factors used to generate the fact, such as the degree of correspondence, centrality of the element to the cluster, existence of a contradictory fact in the corpus, etc. Likewise, one or more of the sentences generated for inclusion in a search result may be selected based on a confidence score. Process 300 may then end, or may select other facts for inclusion or begin again at step 305 with another entity.

If none of the clusters have a cluster score that meets the threshold (330, No), process 300 may end without finding any actions for the entity that can be used to update the graph-based data store or enhance a search result for a query about the entity. It is understood that some of the steps illustrated in FIG. 3 are optional, and implementations need not perform each step, or may perform the steps in a different order.

Figure 4:
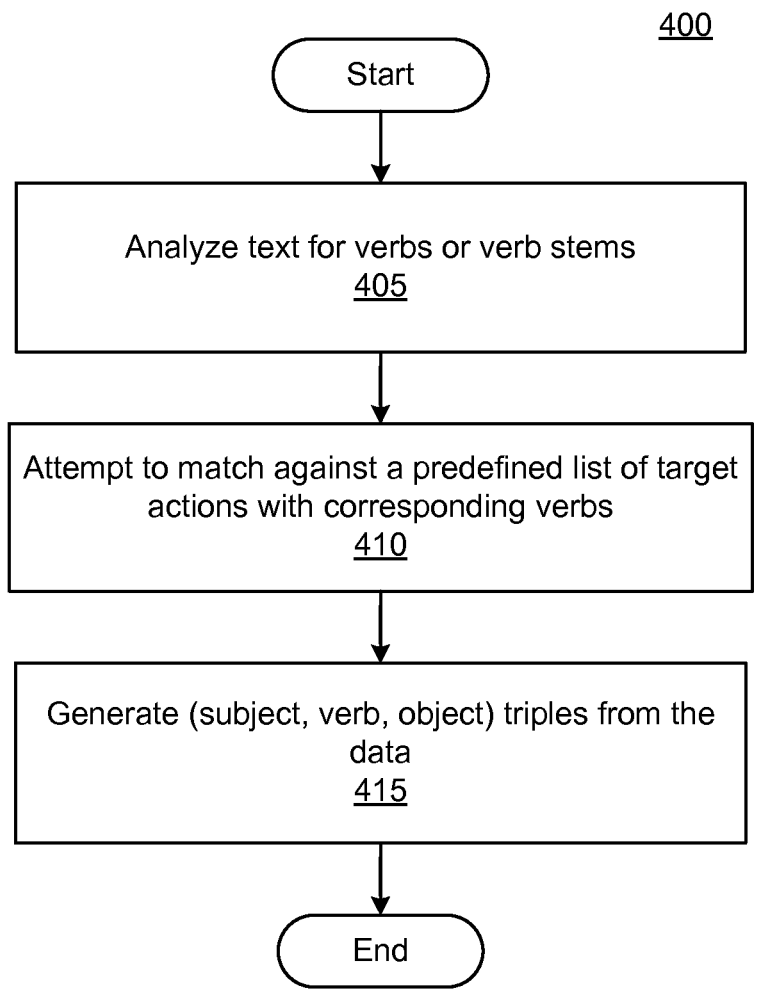
FIG. 4 illustrates a flow diagram of a process for identifying actions performed by an entity from a document text, consistent with disclosed implementations.

FIG. 4 illustrates a flow diagram of an example of a process 400 for identifying actions performed by an entity from content, such as a document text, consistent with disclosed implementations. Process 400 may be performed as part of step 320 of FIG. 1. At step 405, the system may analyze the text for verbs or verb stems that are associated with the entity. For example, the system may use part-of-speech tagging, dependency parsing, coreference resolution, and/or other known or developed methods of syntactic and semantic analysis to identify sentences referring to the entity and to determine the verb or verb stem of the sentence. As used herein, a sentence may refer to a sentence fragment or a small group of sentences and not solely to complete sentences. The verb or verb stem identified in the identified sentence may be considered co-occurring with the entity. In other words, a verb appearing in a sentence with an entity reference may be considered co-occurring with the entity. For example, for the sentence "Barack Obama defeats Mitt Romney," the verb defeats co-occurs with the entities Barack Obama and Mitt Romney.

In some implementations, the system may match the identified verbs or verb stems to a predefined list of target actions. For example, some implementations may be looking for specific types of actions to add to the graph-based data store. Such implementations may keep a predefined list of target actions. A target action is an umbrella term or a class used to represent a category of related actions. For example, a target action may map to a plurality of related verbs or verb stems. For example, the verbs "wed," "marries", "married," "gets hitched," "will elope," etc., may be mapped to a target action of "marry." Thus, the target action may be used to collect or cluster related verbs, verb tenses, and/or verb stems and may be used to refer to the collection of actions. In some implementations, one or more of the target actions may also represent a valid relationship in the graph-based data store. For example, the target action of "marry" may correspond to the "has spouse" relationship, or something similar, in the graph-based data store. In some implementations, the mapping of verbs, verb tenses, verb stems to the target action may include an indication of the relationship in the graph-based data store that the target action corresponds to. In some implementations, to match a target action the identified verb may include additional parts of speech. For example, "wins election" may be mapped to "elected" while "wins game" or "wins match" is not mapped or is mapped to "defeats." In some implementations, when an identified verb does not match a target action, the system may ignore the verb. In other words, verbs identified in step 405 may be discarded if they do not match a target action. In some implementations, step 410 is optional, and clustering, such as in step 325 of FIG. 3, may be used to group similar verbs.

The system may generate subject, verb, object triples from the potential actions (415). Because the system looks for verbs associated with the entity, the entity may be associated with either the subject or the object of the triple. If the verb identified in step 405 matches a target action, the system may substitute the target action for the verb in the triple. This assures that all verbs matching the target action are closely clustered together. Moreover, the system may use pronoun coreference resolution to determine whether a pronoun refers to the entity or not. Thus, any pronouns in the analyzed content may be replaced with the nouns to which they refer, and the subject-verb-object triples may include the nouns. The triples may then be used in clustering to determine whether the various content sources refer to the same triple enough times to use the triple in further actions, such as updating the graph-based data store or enhancing a search result. In some implementations, if an identified verb does not match a target action it receives a lower confidence score. Thus, verbs matching target actions may be used to automatically update the graph-based data store, while verbs that do not match target actions may be used to suggest updates for the graph-based data store.

Figure 5:
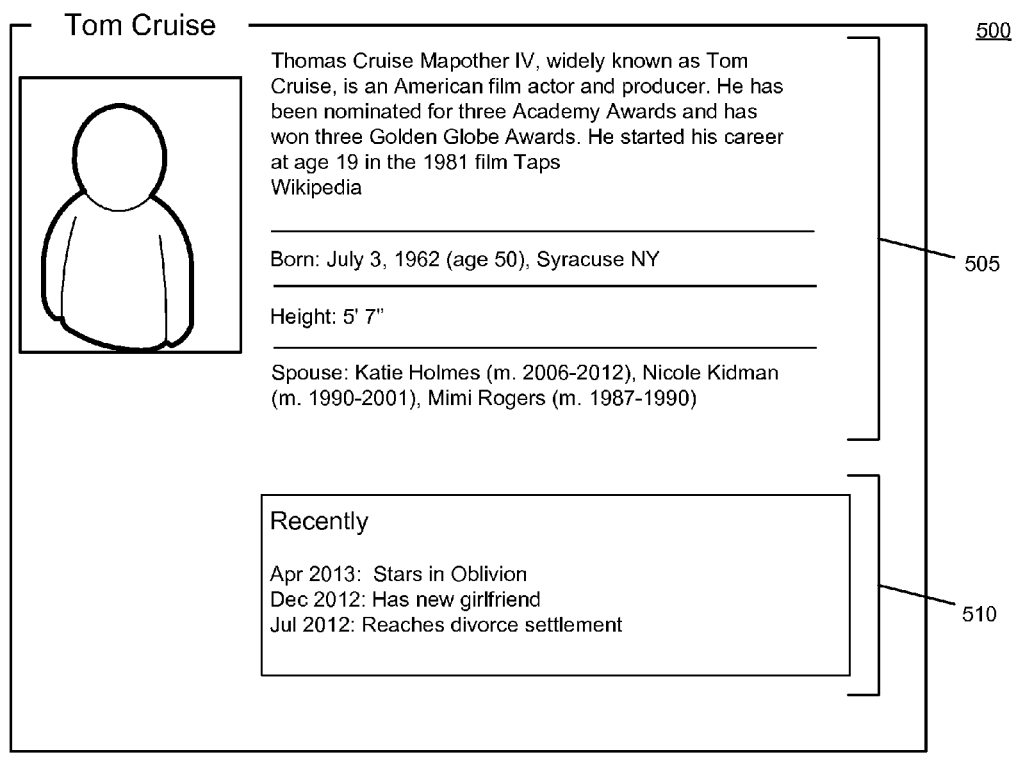
FIG. 5 illustrates an example of a user interface showing enhanced search results with recent actions involving an entity, consistent with disclosed implementations.

FIG. 5 illustrates an example of a user interface 500 illustrating a search result enhanced with recent actions by an entity, consistent with disclosed implementations. A search engine, such as search engine 116 of FIG. 1, may generate information used to display user interface 500 in responding to a request to show search results for a query that relates to an entity in the graph-based data store. Including the recent actions in the search results may be one example of further processing, referred to in step 340 of FIG. 3. The user interface 500 may include search results 505 from a graph-based data store. Of course, other results from other types of documents or corpora may be included in the search results. In some implementations, the search results from the graph-based data store may be included with other results from other sources, such as videos, images, internet documents, etc.

In addition to search results obtained from the graph-based data store, the expanded search results may also include results 510 that identify recent actions by the entity that are not stored in the graph-based data store. The activity may be ephemeral, such as a new girlfriend, or too recent, such as a new movie release, to be included in the graph-based data store. Thus the expanded search results illustrated in user interface 500 show actions related to the entity that may be of interest to someone searching for information related to the entity.

In some implementations, the actions included in the expanded search result 510 may also be used by the system to update the graph-based data store. For example, as shown in FIG. 2, the system may update the graph-based data store to include a new entity 220, the movie Oblivion, and a new relationship 215 between the entity Tom Cruise and the movie Oblivion. In some implementations, the update may be automatically applied when the verb "stars in" is mapped to the acted in relationship. This may occur, for example, as part of step 410 of FIG. 4.

Figure 6:
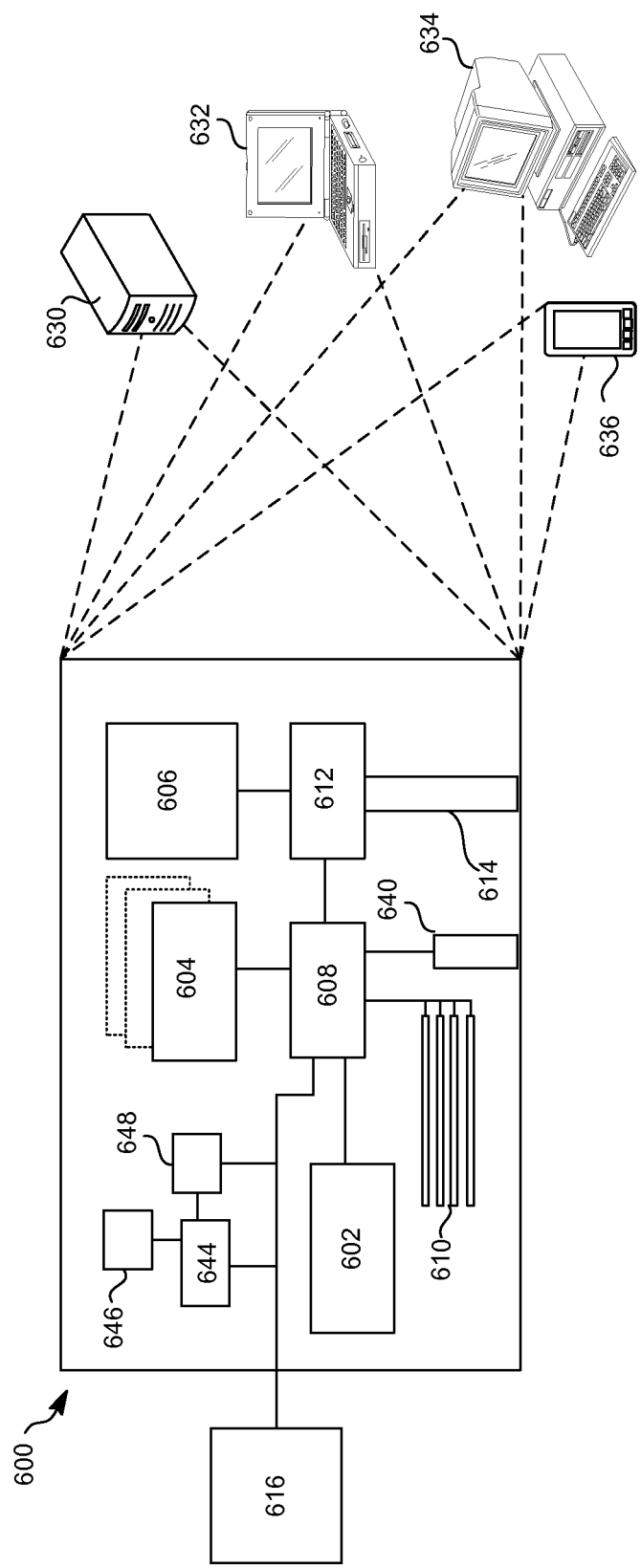
FIG. 6 shows an example of a computer device that can be used to implement the described techniques.

FIG. 6 shows an example of a generic computer device 600, which may be system 100, and/or client 180 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 622, or smart phone 636. An entire system may be made up of multiple computing devices 600 communicating with each other. Other configurations are possible.

FIG. 7 shows an example of a generic computer device 700, which may be system 100 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780*a* includes multiple racks 758*a*-758*n*. Each rack may include one or more processors, such as processors 752*a*-752*n* and 762*a*-762*n*. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752*a*-752*n*. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780*a* may communicate with devices 780*b*, 780*c*, and 780*d*, and these may collectively be known as system 100. As another example, system 100 of FIG. 1 may include one or more computing devices 700 as search engine 116. Furthermore, some of the computing devices may be located geographically close to each other, and others may be located geographically distant. The layout of system 700 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
   memory storing search records;
   memory storing a graph-structured knowledge base that includes entities linked to other entities by relationships;
   at least one processor; and
   memory storing instructions that, when executed by the at least one processor, cause the computer system to perform operations comprising:
   determining a search term associated with a first entity that is identified in a graph-based data store,
   determining a time period having an amount of queries for the search term that meets a threshold,
   selecting documents associated with the time period that are responsive to the search term,
   analyzing the selected documents for an action co-occurring with the search term by,
   for a particular document of the selected documents:
   identifying verbs in content of the particular document, and
   generating a triple for at least one verb of the identified verbs, the triple including a subject, the at least one verb, and an object, wherein either the subject or the object represents the search term, and wherein the action is derived from the triple,
   determining a second entity associated with the action and the search term, the second entity corresponding to either the subject of the triple or the object of the triple not represented by the search term, and
   providing the second entity, the action, and the first entity as an update for the graph-based data store.

2. The system of claim 1, wherein the entity is associated with a query and the memory further stores instructions that, when executed by the at least one processor, causes the computer system to:
   generate text for the action and the first entity; and
   include the text in a search result for the query.

3. The system of claim 2, wherein the text is first text and wherein the search result includes second text describing relationships for the entity from the graph-based data store.

4. The system of claim 1, wherein the threshold is higher than an average number of queries for a second time period occurring prior to the time period and a third time period occurring subsequent to the time period.

5. The system of claim 1, wherein deriving the action includes:
   determining whether the at least one verb maps to a target action; and
   selecting the target action as the action when the at least one verb maps to the target action.

6. The system of claim 1, wherein the second entity is not already identified in the graph-based data store.

7. The system of claim 1, wherein the memory further stores instructions that, when executed by the at least one processor, cause the computer system to:
   automatically update the graph-based data store when the at least one verb maps to a target action.

8. A computer-implemented method comprising:
   determining, by at least one processor, at least one search term for an entity in a data graph stored in memory that includes entities linked to other entities by relationships;
   determining, by the at least one processor, a time period having an increase in queries for the at least one search term, the increase meeting a threshold;
   determining documents having dates associated with the time period, the documents being responsive to the at least one search term;
   analyzing the documents to determine an action appearing in a minimum number of the documents, where the action is represented by subject, verb, object triples where, for each triple the search term corresponds to the subject or the object of the triple and wherein the action is derived from the triple; and
   providing an update for the data graph based on the triple.

9. The method of claim 8, wherein dates for the documents are within a temporal distance of the time period.

10. The method of claim 9, wherein the temporal distance is determined as a function of a size of the increase.

11. The method of claim 9, wherein the temporal distance is determined as a function of an amount of time that has elapsed time since the time period.

12. The method of claim 8, wherein analyzing a document of the documents includes:
   identifying verbs in content of the document;
   matching at least one verb of the identified verbs to the action, the action being a target action from a set of target actions; and
   generating the triple using the target action as the verb.

13. The method of claim 12 further comprising:
   automatically updating the data graph in response to the at least one verb mapping to the target action.

14. The method of claim 12, wherein target actions in the set of target actions correspond with respective relationships in the data graph.

15. The method of claim 8, wherein the analyzing results in a plurality of triples and the triple is in the plurality of triples, and determining the action includes:
   clustering the triples in the plurality of triples into cluster groups based at least on a mapping of the verbs of the triples to actions;
   determining whether at least one cluster group meets a threshold cluster score; and
   providing the update when the at least one cluster group meets the threshold cluster score, wherein the at least one cluster group represents the action and the triple is a member of the at least one cluster group.

16. The method of claim 12, wherein the triple is selected based on centrality of the triple to the cluster group.

17. The method of claim 8, wherein the threshold is greater than an average frequency of queries that are associated with the at least one search term for time periods of similar length.

18. The method of claim 8, wherein the at least one search term includes a name of the entity appended with a form of a verb.

19. A computer-implemented method comprising:
   determining, by at least one processor, at least one search term for an entity in a data graph that relates to a search query, the data graph including entities linked to other entities by relationships;
   determining, by the at least one processor, a time period having an amount of queries that meets a threshold, the queries included in the amount being associated with the at least one search term;
   determining documents having dates associated with the time period, the documents being responsive to the at least one search term;
   analyzing the documents to determine an action appearing in a minimum number of the documents, where the action is represented by subject, verb, object triples where, for each triple the search term corresponds to the subject or the object of the triple and wherein the action is derived from the triple; and
   generating text, by the at least one processor, describing the triple for inclusion in a search result for the search query.

* * * * *

UNITED STATES PATENT AND TRADEMARK OFFICE
CERTIFICATE OF CORRECTION

| | | |
|---|---|---|
| PATENT NO. | : 9,235,653 B2 | Page 1 of 1 |
| APPLICATION NO. | : 13/927606 | |
| DATED | : January 12, 2016 | |
| INVENTOR(S) | : Haran Talmon et al. | |

It is certified that error appears in the above-identified patent and that said Letters Patent is hereby corrected as shown below:

Claims

In column 17, line 16, in claim 16, delete "claim 12," and insert --claim 15,--, therefor.

Signed and Sealed this
Twelfth Day of April, 2016

Michelle K. Lee
*Director of the United States Patent and Trademark Office*